(12) United States Patent
Liu et al.

(10) Patent No.: US 10,949,542 B2
(45) Date of Patent: Mar. 16, 2021

(54) SELF-EVOLVED ADJUSTMENT FRAMEWORK FOR CLOUD-BASED LARGE SYSTEM BASED ON MACHINE LEARNING

(71) Applicant: International Business Machines Corporation, Armonk, NY (US)

(72) Inventors: Pei Jian Liu, Beijing (CN); Ye Yu, Beijing (CN); Chih-Hsiung Liu, Taipei (TW); Bing Xin Wang, Beijing (CN); Jin Zhang, Beijing (CN); Yan Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 16/199,202

(22) Filed: Nov. 25, 2018

(65) Prior Publication Data
US 2020/0167475 A1    May 28, 2020

(51) Int. Cl.
| G06F 21/57 | (2013.01) |
|---|---|
| G06F 21/40 | (2013.01) |
| G06K 9/62 | (2006.01) |
| G06N 3/04 | (2006.01) |
| G06N 3/08 | (2006.01) |
| G06F 21/64 | (2013.01) |

(52) U.S. Cl.
CPC ............ *G06F 21/577* (2013.01); *G06F 21/40* (2013.01); *G06K 9/6256* (2013.01); *G06N 3/04* (2013.01); *G06N 3/08* (2013.01)

(58) Field of Classification Search
CPC ........ G06F 21/577; G06F 21/40; G06F 21/64; G06F 21/6218; G06K 9/6256; G06N 3/04; G06N 3/08
See application file for complete search history.

(56) References Cited

U.S. PATENT DOCUMENTS

| 8,806,618 | B2 | 8/2014 | Livshits et al. |
| 10,057,227 | B1 * | 8/2018 | Hess ........................ G06F 21/31 |
| 10,110,738 | B1 * | 10/2018 | Sawant ................. H04M 3/436 |

(Continued)

FOREIGN PATENT DOCUMENTS

CN    106528266    3/2017

OTHER PUBLICATIONS

Potdar et al. "Security Solutions for Cloud Computing," International Journal of Computer Applications (0975-8887), vol. 128, No. 16. Oct. 2015, pp. 17-21.

(Continued)

*Primary Examiner* — Darren B Schwartz
(74) *Attorney, Agent, or Firm* — VanLeeuwen & VanLeeuwen; Alexander G. Jochym

(57) ABSTRACT

An approach is provided that trains neural network by receiving data inputs to a cloud-based system from users, gathering a sets of responsive system data from the cloud-based system, and training the neural network by passing the received data inputs and corresponding sets of responsive data through the neural network. After the training is performed, the approach receives user actions from a user of the cloud-based system, inputs the user actions to the trained neural network and receives one or more predicted next user actions from the trained neural network. Based on the predicted next user actions, the approach then performs a proactive response at the cloud-based system.

17 Claims, 7 Drawing Sheets

(56) References Cited

U.S. PATENT DOCUMENTS

| | | | |
|---|---|---|---|
| 10,311,356 B2* | 6/2019 | Gu | G06N 3/08 |
| 10,552,728 B2* | 2/2020 | Oliner | G06F 40/274 |
| 10,635,973 B1* | 4/2020 | Dirac | G06N 3/088 |
| 10,699,009 B2* | 6/2020 | Scherman | H04L 63/1416 |
| 10,715,570 B1* | 7/2020 | Feinstein | H04L 65/4069 |
| 2010/0235310 A1* | 9/2010 | Gage | G06N 3/082 |
| | | | 706/14 |
| 2010/0268524 A1* | 10/2010 | Nath | H04L 67/22 |
| | | | 703/23 |
| 2010/0299292 A1 | 11/2010 | Collazo | |
| 2013/0103624 A1* | 4/2013 | Thieberger | G06N 5/046 |
| | | | 706/12 |
| 2015/0269580 A1* | 9/2015 | Subramanian | G06Q 20/4016 |
| | | | 705/44 |
| 2017/0339022 A1* | 11/2017 | Hegde | H04L 41/142 |
| 2018/0004948 A1* | 1/2018 | Martin | G06F 21/566 |
| 2018/0018456 A1* | 1/2018 | Chen | G06F 21/552 |
| 2018/0192265 A1* | 7/2018 | Zawada | G06N 3/08 |
| 2019/0028557 A1* | 1/2019 | Modi | H04L 67/22 |
| 2019/0102706 A1* | 4/2019 | Frank | G06K 9/6256 |
| 2019/0147356 A1* | 5/2019 | Peng | G06N 7/005 |
| | | | 706/21 |
| 2019/0260742 A1* | 8/2019 | Arora | H04W 12/06 |
| 2020/0065513 A1* | 2/2020 | Sridharan | G06F 21/629 |

OTHER PUBLICATIONS

Stephan et al., "Neural Network Approach to Web Application Protection," International Journal of Information and Education Technology, vol. 5, No. 2, Feb. 2015, pp. 150-155.

* cited by examiner

SELF-EVOLVED ADJUSTMENT FRAMEWORK FOR CLOUD-BASED LARGE SYSTEM BASED ON MACHINE LEARNING

BACKGROUND OF THE INVENTION

Description of Related Art

Traditional cloud-based systems face almost continuous threats and vulnerabilities. Traditional approaches are generally directed at vulnerabilities found in operating systems and in the network.

SUMMARY

An approach is provided that trains neural network by receiving data inputs to a cloud-based system from users, gathering sets of responsive system data from the cloud-based system, and training the neural network by passing the received data inputs and corresponding sets of responsive data through the neural network. After the training is performed, the approach receives user actions from a user of the cloud-based system, inputs the user actions to the trained neural network and receives one or more predicted next user actions from the trained neural network. Based on the predicted next user actions, the approach then performs a proactive response at the cloud-based system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
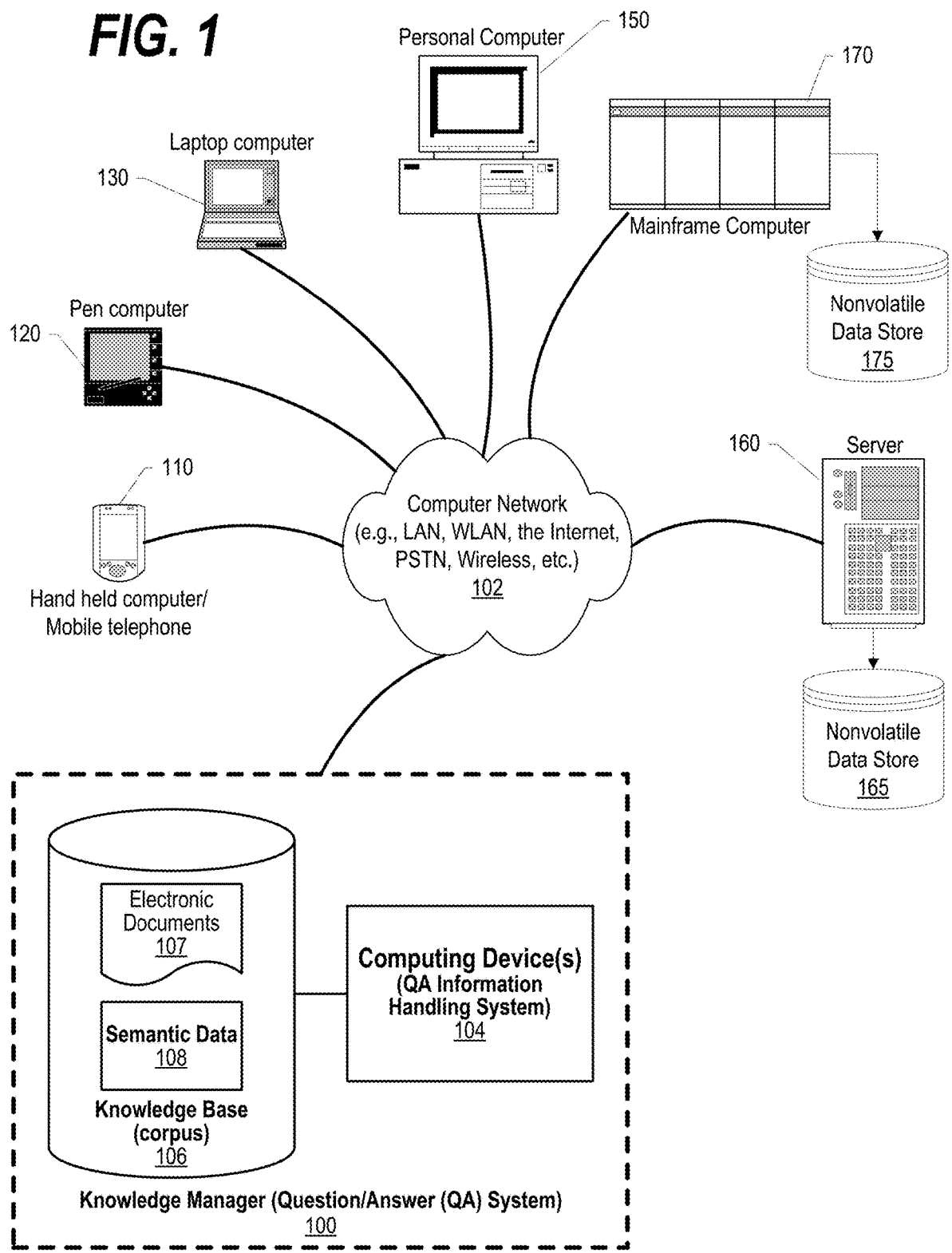
FIG. 1 depicts a network environment that includes a knowledge manager that utilizes a knowledge base.

FIGS. 1-7 describe an approach that provides a self-evolved adjustment framework for cloud-based large systems based on machine learning. The approach provides a framework based on a Long Short-Term Memory (LSTM) neural network. LSTM networks are a type of recurrent neural network capable of learning order dependence in sequence prediction problems. This is a behavior required in complex problem domains like machine translation, speech recognition, and more. LSTMs are a complex area of deep learning. The approach further provides a hot-deployed tool that senses risks to the cloud-based system in near real time and provides alerts when a risk is identified. The approach further provides the service with API granularity that allows adjustment of the resource allocation in near real time in a manner that addresses resource issues identified in the cloud-based system.

Traditional security systems of cloud-based systems are inadequate to identify defects in business logic. In traditional systems, each service application that handles ample amounts of data creates its own bottleneck. In traditional systems, after the service application is online, the bottleneck exists until a new version is brought online. Even when administrators identify the location of a bottleneck, traditional systems require an updated version to be built and deployed before the bottleneck can be addressed. Vulnerability scanning tools currently used only address regular system vulnerabilities. An anti-hacker team can be deployed, however this approach is quite expensive and usually have limited service time. Performance monitoring software can be utilized, however such performance monitoring cannot provide real-time adjustments to cloud-based system settings. The approach described herein addresses these deficiencies found in traditional systems.

In one embodiment, the system operates by parsing a user's request data as well as the response data while, simultaneously, gathering system metrics such as CPU utilization, memory usage, disk IO, and network data. Additionally, the system can parse a client operation log to gather even more details. The approach then analyzes the gathered data using an LSTM network that is trained by providing a specific model, the gathered system and user data.

Based on a model that is created by historical data, the approach anticipates the next possible steps based on the current step in near real-time. In one embodiment, each step is a method that is called using an API with supplied parameters. Some of the properties include the possibility of a particular step occurring, the performance considerations if the anticipated step occurs, the security risk of performing a particular step, and the importance of performing a particular step. The possibility is, in one embodiment, the probability of the step being the next invocation after the current step. The performance considerations include CPU utilization, memory usage, disk IO, and network occupations. The risk is the possibility of security consequences occurring once the current, or anticipated, step is invoked after calling the previous step. Finally, the importance is the importance of the data being accessed, such as the sensitivity of the data or the overall importance of the data to the organization.

Actions are performed with respect to the analysis. The action can be based on the importance. For example, if a user's behavior is outside of a desired scope of a last step and the current, or anticipated, step's importance and possibility are outside of a reasonable range, the system can proactively mark the user's behavior as being potentially risky and perform a security action with respect to the user. For example, the system could send the user a verification code to ensure that the user is not an imposter. With regard to performance, if the next anticipated step is of high importance but has poor performance values associated with it, the system can automatically and proactively direct additional computing resources to the cloud-based system so that the anticipated step does not adversely impact system performance. Finally, with respect to risk, if the chain of steps, including anticipated steps, is likely to cause a serious security or system issue, such as a system crash, then the system can proactively cease performance of the next step to prevent the serious issue from occurring.

In an embodiment, the example model described herein may be a deep learning model based on a Long Short-Term Memory (LSTM) neural network. Moreover, the techniques and methods described herein can be applied to any deep learning model, including those based on convolutional neural networks (CNN). For example, the techniques and methods may also be employed with the AlexNet, VGG, Inception, ResNet, DenseNet deep learning models.

Inventive Advantages

The inventors have discovered that a system that provides a self-evolved adjustment framework for cloud-based large systems based on machine learning advantageously provides fewer bottlenecks and, consequently, better system performance than traditional systems. The system also provides improved computer security by identifying security risks in a near real-time fashion based upon user actions and anticipated follow-up actions. The system also conserves computing resources by providing API granularity that allows adjustment of resource allocation in a near real-time manner. The system can self-evolve reducing the amount of time and resources, both monetary and computing, needed to update the system as compared with traditional systems. Thus, the approach reduces upgrade costs associated with the system. By performing near real-time resource allocation, the approach described herein reduces or prevents costly maintenance issues and reduces system maintenance costs.

Terminology and Scope

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
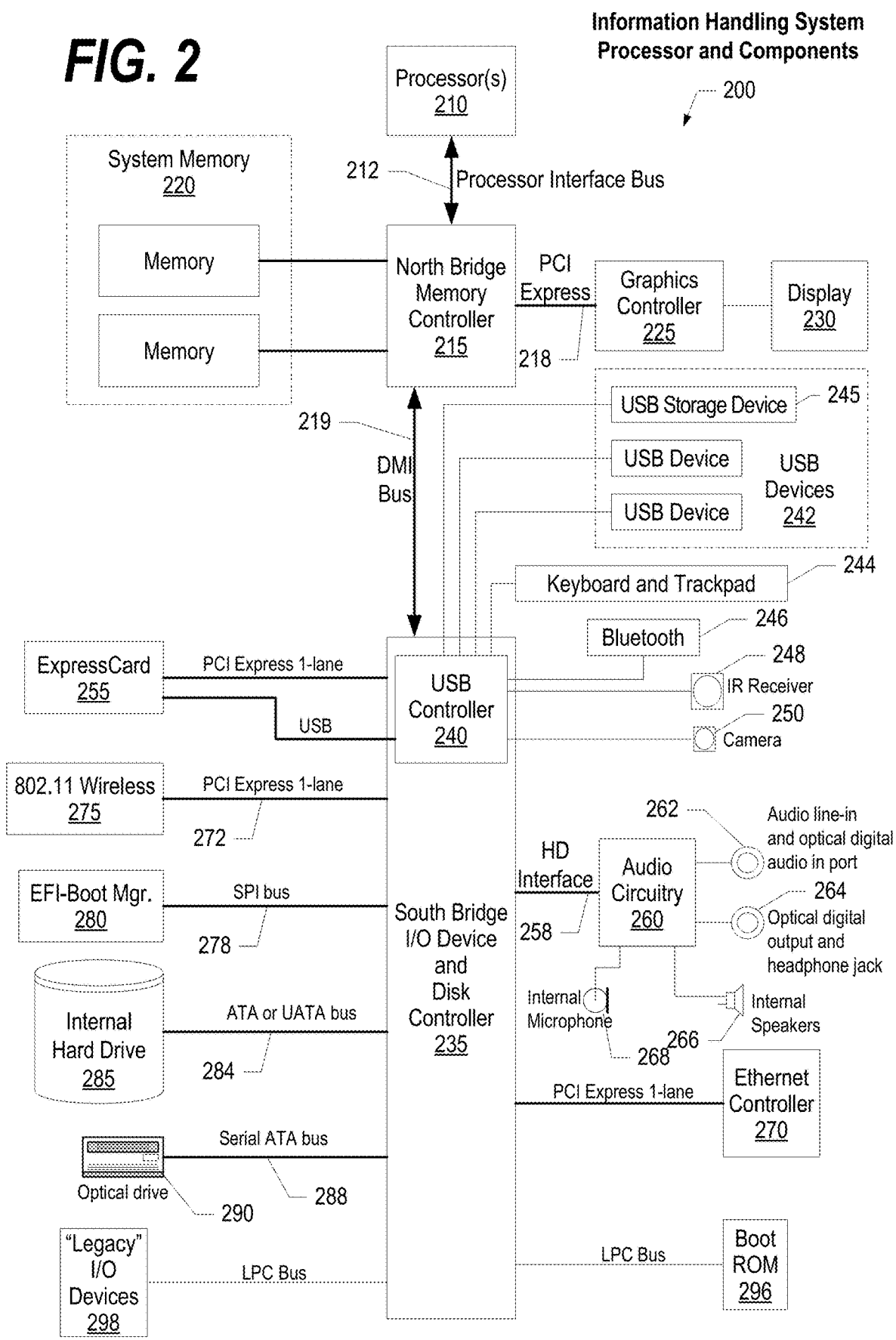
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
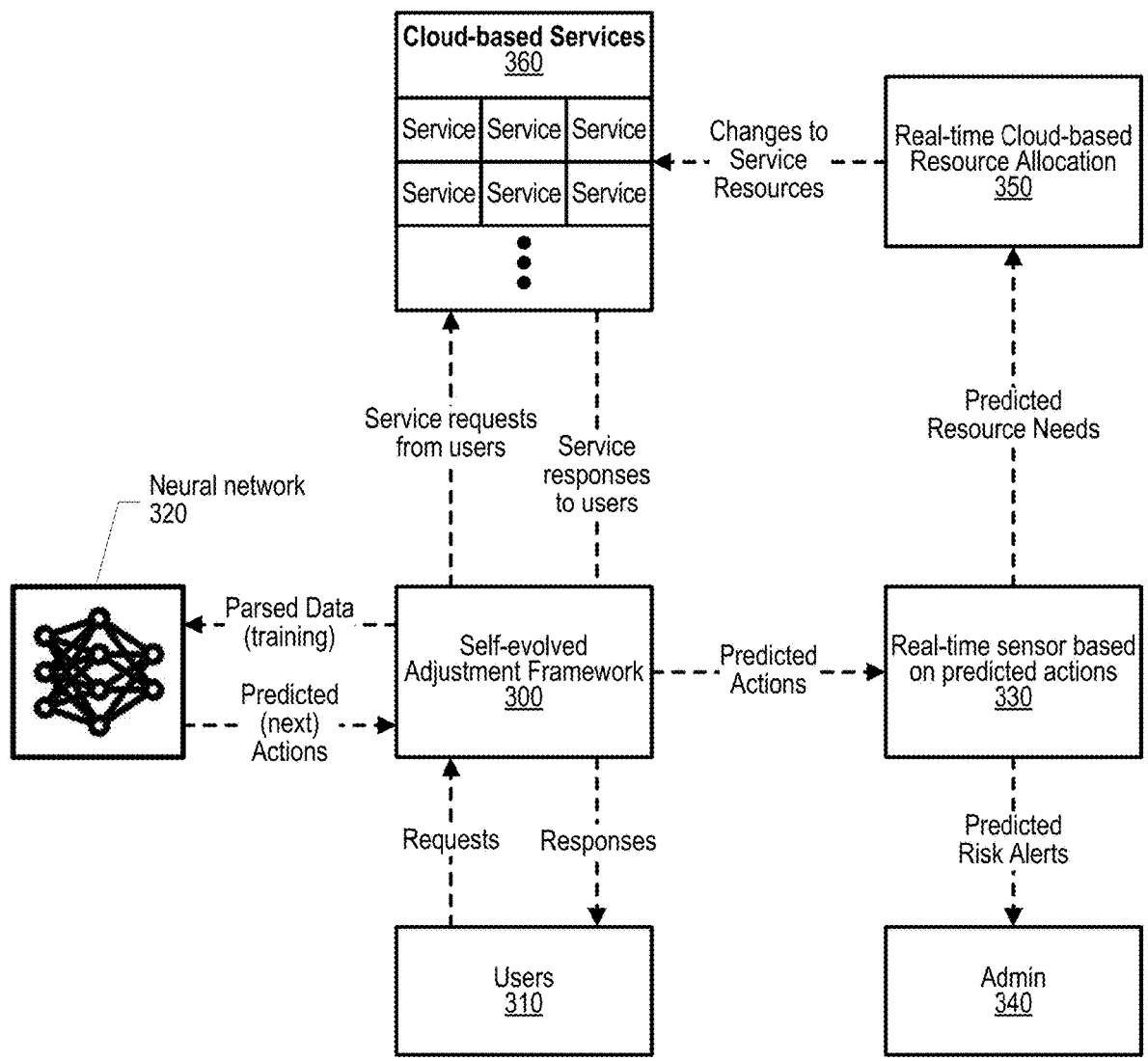
FIG. 3 is a component diagram that provides a self-evolved adjustment framework for cloud-based large systems based on machine learning.

FIG. 3 is a component diagram that provides a self-evolved adjustment framework for cloud-based large systems based on machine learning. Self-evolved adjustment framework 300 receives user actions (requests) from users 310 with such user actions being directed to cloud-based system 360 that provides any number of services. Self-evolved adjustment framework 300 parses data input from users 310 and response data output from cloud-based services 360 and inputs the parsed data to neural network 320, such as a Long Short-Term Memory (LSTM) neural network.

Once neural network 320 is adequately trained, self-evolved adjustment framework 300 utilizes the trained neural network to predict the next user actions from a user. Here, users 310 input requests that are received or intercepted by self-evolved adjustment framework 300 which inputs the user actions to the trained neural network 320. In one embodiment, self-evolved adjustment framework 300 also passes the response data from cloud-based services 360 to the trained neural network. Trained neural network 320 responds with one or more predicted next user actions. These predicted actions are passed to module 330 that includes a real-time sensor that is based on the predicted user actions. Given the predicted user actions, the system predicts risks that are provided to system personnel or used to ensure that the user is not an imposter or to inhibit performance of actions that are deemed too risky to be performed by the user.

In addition, the predicted user actions are used to anticipate possible system performance issues that might arise. These anticipated system performance issues are proactively addressed with changes to cloud-based system and services (e.g., CPU resources, memory resources, disk I/O resources, network resource, etc.) being determined before such additional or different resources are actually needed. The predicted resource needs are passed to module 350 that provides near real-time cloud-based resource allocation that changes the resources utilized by cloud-based services in light of the predicted resource needs.

Figure 4:
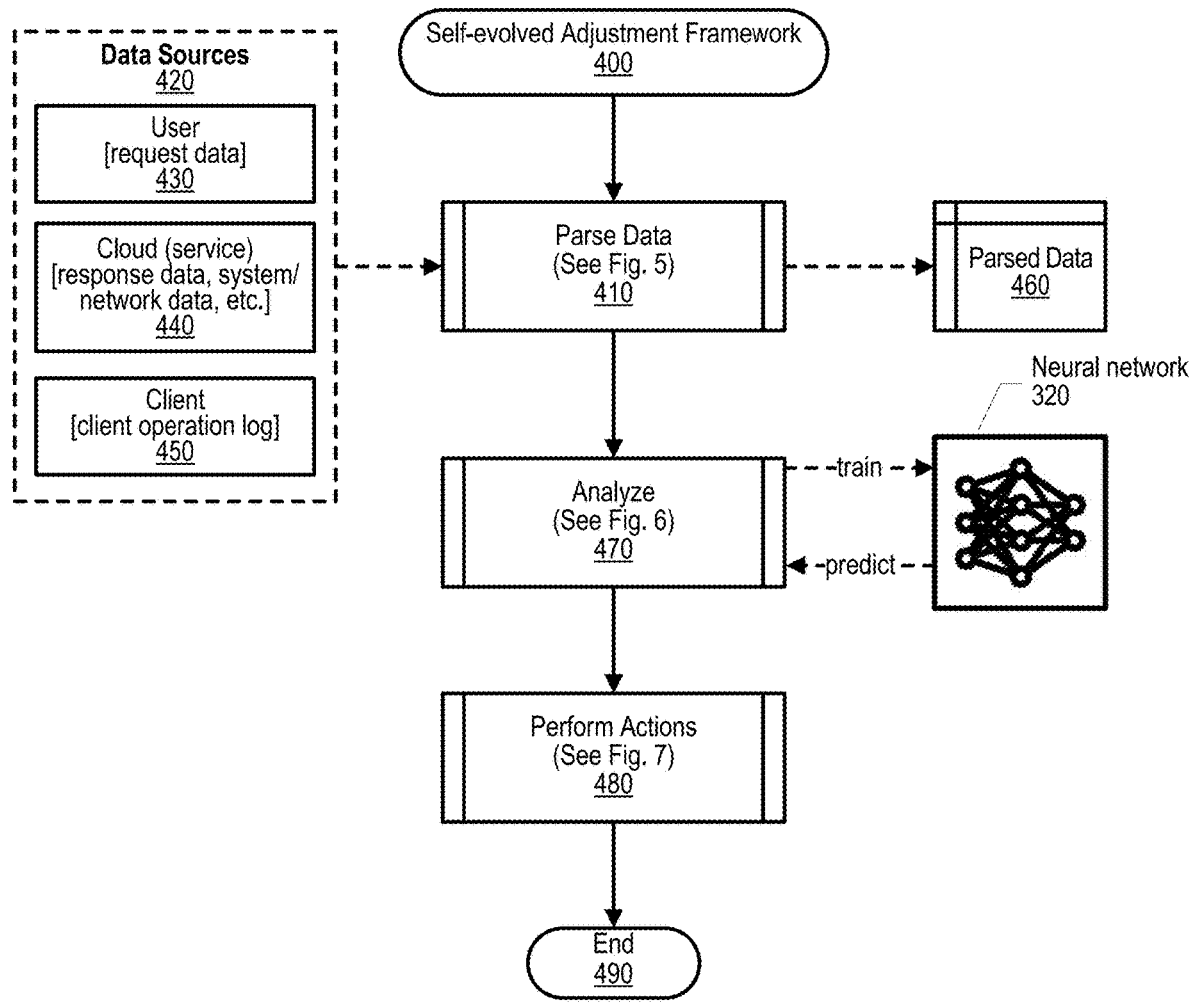
FIG. 4 is a depiction of a flowchart showing the logic used to deploy a self-evolved adjustment framework.

FIG. 4 is a depiction of a flowchart showing the logic used to deploy a self-evolved adjustment framework. FIG. 4 processing commences at 400 and shows the steps taken by a process that provides a self-evolved adjustment framework. At predefined process 410, the process performs the Parse Data routine (see FIG. 5 and corresponding text for processing details). This routine receives inputs from data sources 420 that include user input data, or actions 430, cloud-based service response data 440 that includes system resource data, and client operation log data 450. The result of predefined process 410 is parsed data that is stored in memory area 460 and that can be input, or passed, to neural network 320.

Figure 6:
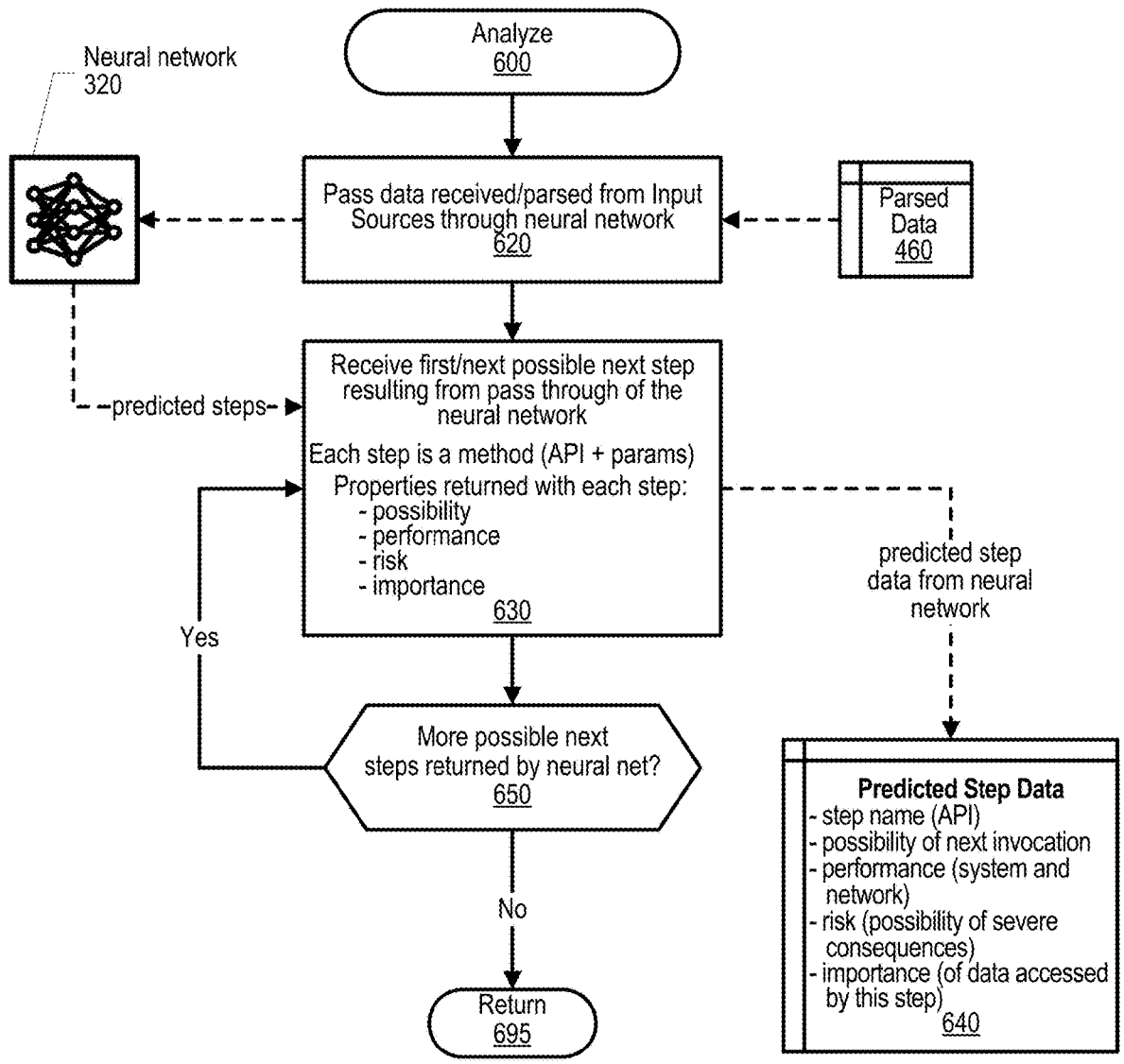
FIG. 6 is a depiction of a flowchart showing the logic used to analyze data.

At predefined process 470, the process performs the Analyze routine (see FIG. 6 and corresponding text for processing details). This routine trains neural network 320 by passing data received from data sources 420 that has been parsed and stored in memory area 460. Once neural network 320 is adequately trained, then the input data (parsed data 460) can be passed to the neural network and the neural network responds with one or more predicted next user actions.

Figure 7:
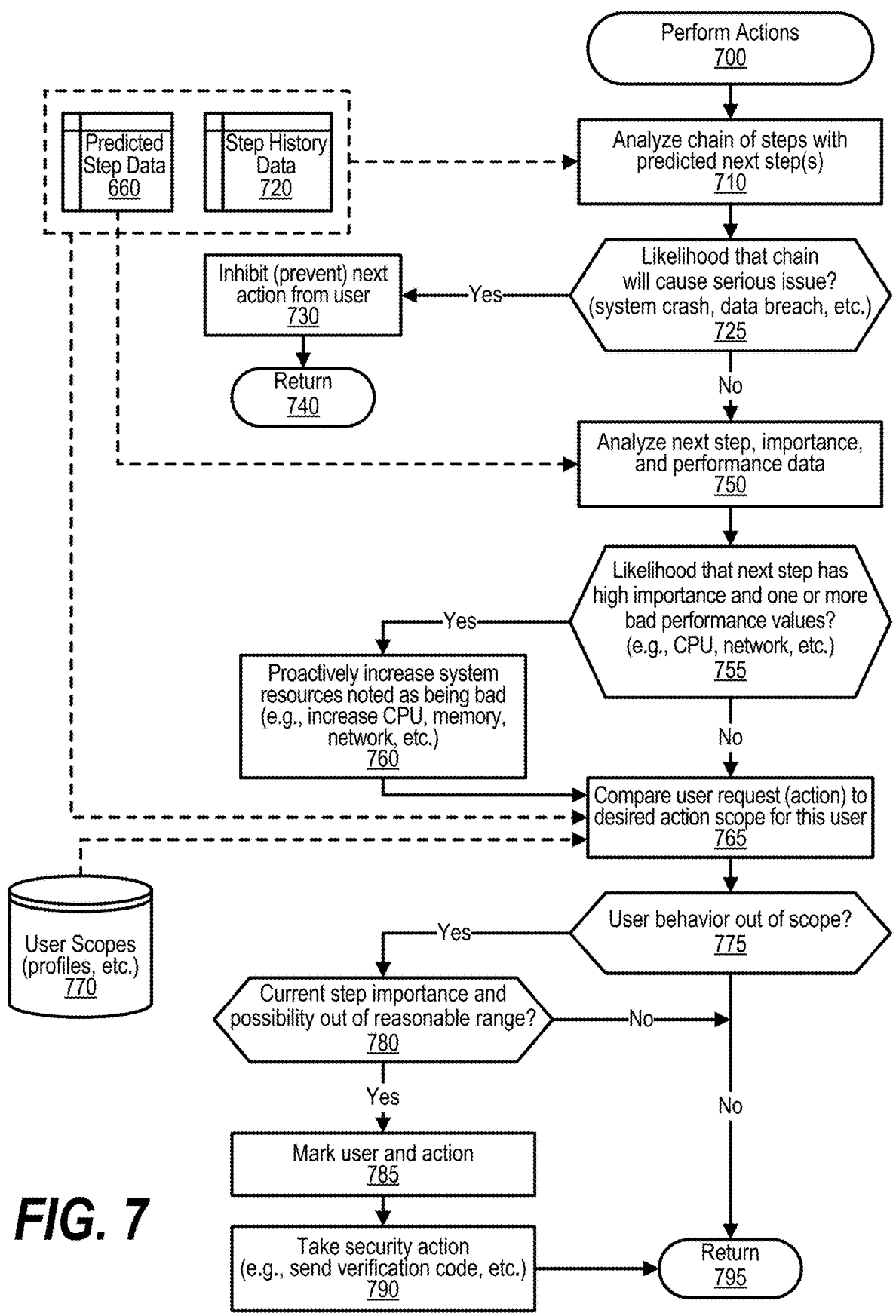
FIG. 7 is a depiction of a flowchart showing the logic used to perform actions based on the analysis of the data.

At predefined process 480, the process performs the Perform Actions routine (see FIG. 7 and corresponding text for processing details). Based on the predicted next user actions, this routine will identify risks to the cloud-based system as well as likely system resource issues that might arise from such predicted actions. The system can then work to prevent risks to the system as well as proactively change the system resources so that the predicted next user actions are less likely to impact system performance. FIG. 4 processing thereafter ends at 490.

Figure 5:
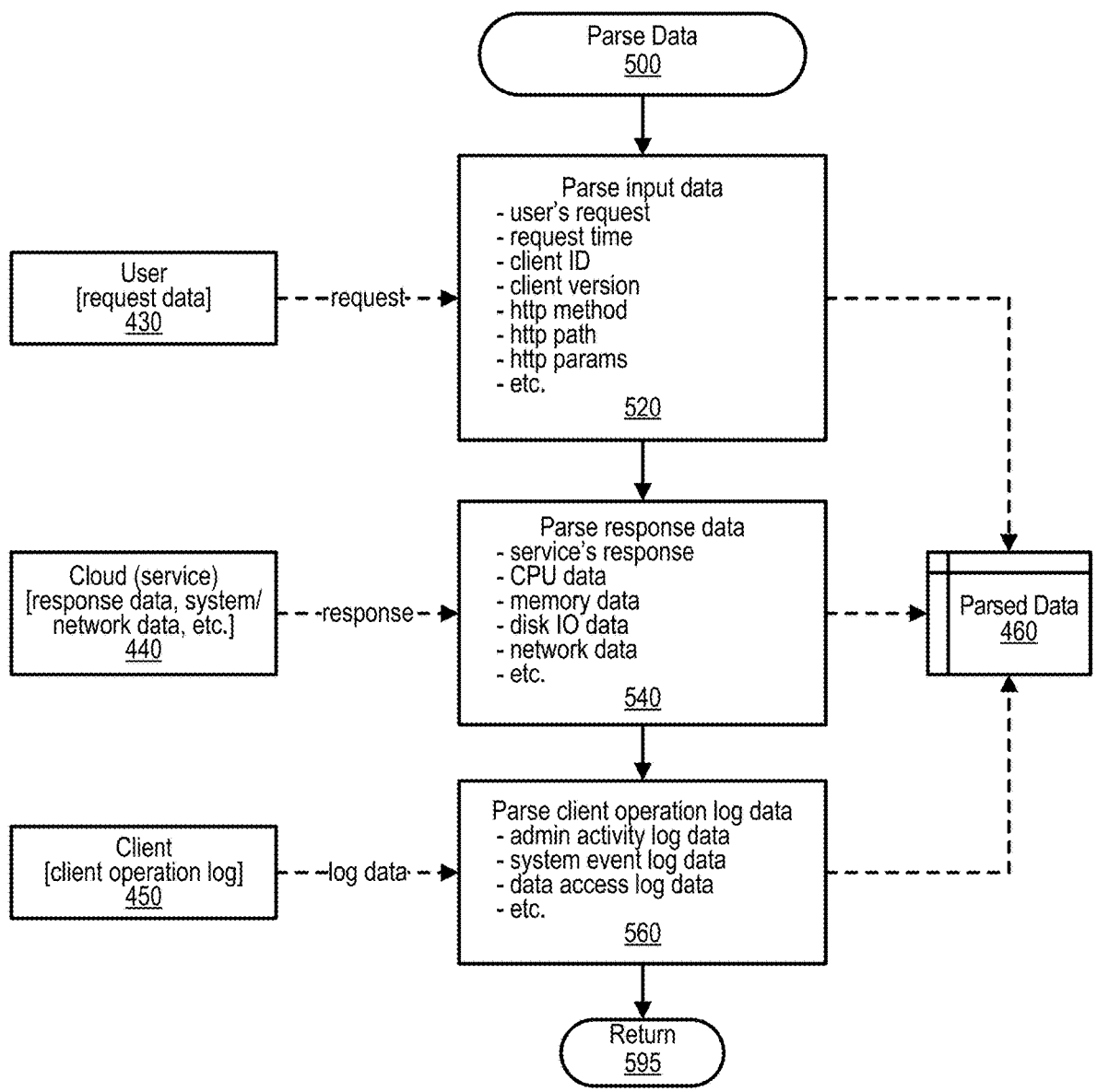
FIG. 5 is a depiction of a flowchart showing the logic used to parse the data received from various data sources.

FIG. 5 is a depiction of a flowchart showing the logic used to parse the data received from various data sources. FIG. 5 processing commences at 500 and shows the steps taken by a process that parses data for processing by a neural network. At step 520, the process parses user input data 430. This data includes the user's request data, the request time, the client identifier, the client version, the http method, the http path, the http params, and any other data that might be retrieved from a user's input at a cloud-based system. This parsed user input data is stored in memory area 460.

At step 540, the process parses response data 440. This data includes the service's response data, the CPU data (utilization, etc.), memory data, disk IO data, network resource data, and the like. This parsed cloud-service data is stored in memory area 460.

At step 560, the process parses client operation log data 450. This data includes admin activity log data, system event log data, data access log data, and other client operation log related data. This parsed client operation log data is stored in memory area 460. FIG. 5 processing thereafter returns to the calling routine (see FIG. 4) at 595.

FIG. 6 is a depiction of a flowchart showing the logic used to analyze data. FIG. 6 processing commences at 600 and shows the steps taken by a process that analyzes data to determine one or more predicted next user actions. At step 620, the process passes data received and parsed from input sources that is stored in memory area 460 through trained neural network 320.

At step 630, the process receives the first predicted next step from neural network 320. The predicted next step results from the pass through of the data through the trained neural network with the neural network using its training (model) to predict one or more next user actions. Each action is a method (API+parameters). The properties returned include the possibility of a particular step occurring, the performance considerations if the anticipated step occurs, the security risk of performing a particular step, and the importance of performing a particular step. The possibility is, in one embodiment, the probability of the step being the next invocation after the current step. The performance considerations include CPU utilization, memory usage, disk IO, and network occupations. The risk is the possibility of security consequences occurring once the current, or anticipated, step is invoked after calling the previous step. Finally, the importance is the importance of the data being accessed, such as the sensitivity of the data or the overall importance of the data to the organization.

Actions are performed with respect to the analysis. The action can be based on the importance. For example, if a user's behavior is outside of a desired scope of a last step and the current, or anticipated, step's importance and possibility are outside of a reasonable range, the system can proactively mark the user's behavior as being potentially risky and perform a security action with respect to the user. For example, the system could send the user a verification code to ensure that the user is not an imposter. With regard to performance, if the next anticipated step is of high importance but has poor performance values associated with it, the system can automatically and proactively direct additional computing resources to the cloud-based system so that the anticipated step does not adversely impact system performance. Finally, with respect to risk, if the chain of steps, including anticipated steps, is likely to cause a serious security or system issue, such as a system crash, then the system can proactively cease performance of the next step to prevent the serious issue from occurring. The predicted next action data is stored in memory area 640.

The process determines as to whether there are more possible next actions that have been returned by neural network 320 (decision 650). If more possible next actions were returned by the neural network, then decision 650 branches to the 'yes' branch which loops back to step 630 to process the next predicted user action returned by neural network 320. This looping continues until all of the predicted next user actions have been processed, at which point decision 650 branches to the 'no' branch exiting the loop. FIG. 6 processing thereafter returns to the calling routine (see FIG. 4) at 695.

FIG. 7 is a depiction of a flowchart showing the logic used to perform actions based on the analysis of the data. Processing commences at 700 whereupon, at step 710, the process analyzes a chain of steps (actions) being performed by the user with the chain of actions including steps already taken by the user (retrieved from memory area 720) as well as predicted next user steps that were received from the trained neural network and stored in memory area 660.

Based on the analysis, the process determines whether there is a high likelihood that the analyzed chain will cause a serious issue for the cloud-based system service, such as a system crash, data breach, or the like (decision 725). If a high likelihood exists, then decision 725 branches to the 'yes' branch whereupon, at step 730, the process prevents or otherwise inhibits the user from performing the predicted next step and processing thereafter returns to the calling routine at 740. On the other hand, if a high likelihood of a serious issue does not exist, then decision 725 branches to the 'no' branch and processing continues.

At step 750, the process analyzes the predicted next user actions, the importance, and the predicted system performance (resource) data. A determination is made whether there is a high likelihood that the predicted next step has a high importance and also corresponds to one or more bad performance values, such as CPU utilization, memory usage, disk I/O, network utilization or the like (decision 755). If such a likelihood exists, then decision 755 branches to the 'yes' branch whereupon, at step 760 the process Proactively increase system resources noted as being impacted (e.g., increase CPU resources, increase available memory, increase disk I/O, increase or change network availability, etc. On the other hand, if such a likelihood does not exist, then decision 755 branches to the 'no' branch bypassing step 760.

At step 765, the process compares the predicted next user actions to the desired action scope for this user or class of user with desired action scope data being retrieved from data store 770. Based on the comparison, the process determines whether the anticipated next user actions are out of scope (decision 775). If the anticipated next user actions are out of scope, then decision 775 branches to the 'yes' branch to perform steps 780 through 790, otherwise decision 775 branches to the 'no' branch bypassing these steps.

At decision 780, the process determines whether the current anticipated next user step is of high importance and the action is out of range for the user (decision 780). If these conditions exist, then decision 780 branches to the 'yes' branch to perform steps 785 and 790, otherwise decision 780 branches to the 'no' branch bypassing these steps. At step 785, the process marks, or flags, the user and the predicted next user steps and, at step 790, the process performs additional security actions, such as sending a verification code to the user's mobile device and having the user enter the verification code at the cloud-based system to verify that the user is not a malevolent user or an imposter. Processing thereafter returns to the calling routine (see FIG. 4) at 795.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
    training neural network, wherein the training comprises:
        receiving a plurality of data inputs to a cloud-based system from a plurality of users;
        gathering a plurality of sets of responsive system data from the cloud-based system, wherein each of the sets of responsive data corresponds to one or more of the received data inputs; and
        training the neural network by passing the received data inputs and corresponding sets of responsive data through the neural network;
    receiving one or more user actions from a user of the cloud-based system;
    inputting the one or more user actions to the trained neural network;
    receiving one or more predicted next user actions from the trained neural network;
    identifying that a selected one of the predicted next user actions is of a high importance and is outside of a pre-defined range; and
    performing a proactive response that is based on a behavior of the user that is identified as being outside of a pre-defined scope and the selected high importance predicted next user action.

2. The method of claim 1 wherein the neural network is a Long Short-Term Memory (LSTM) neural network.

3. The method of claim 1 further comprising:
    determining that the predicted next user actions are likely to cause a system performance issue at the cloud-based system;
    identifying the proactive response to address the determined system performance issue; and
    performing the identified proactive response prior to receiving one or more next user actions from the user.

4. The method of claim 3 wherein the system performance issue is selected from the group consisting of a CPU utilization issue, a memory usage issue, a storage I/O issue, and a network utilization issue.

5. The method of claim 1 further comprising:
    determining that the predicted next user actions are likely to cause a security issue at the cloud-based system; and
    identifying and performing a proactive security response prior to receiving one or more next user actions from the user, wherein the proactive security response increases the security of the cloud-based system, and wherein the proactive security response is performed prior to receiving one or more next user actions from the user.

6. The method of claim 5 further comprising:
sending the user a verification code to a mobile device assigned to the user to verify that the user is an authorized user of the cloud-based system;
receiving a user-input code from the user;
inhibiting use of the cloud-based system by the user in response to the received user-input code being different from the sent verification code; and
allowing use of the cloud-based system by the user in response to the received user-input code matching the sent verification code.

7. An information handling system comprising:
one or more hardware processors;
a memory coupled to at least one of the hardware processors; and
a set of computer program instructions stored in the memory and executed by at least one of the hardware processors in order to perform actions comprising:
training neural network, wherein the training comprises:
receiving a plurality of data inputs to a cloud-based system from a plurality of users;
gathering a plurality of sets of responsive system data from the cloud-based system, wherein each of the sets of responsive data corresponds to one or more of the received data inputs; and
training the neural network by passing the received data inputs and corresponding sets of responsive data through the neural network;
receiving one or more user actions from a user of the cloud-based system;
inputting the one or more user actions to the trained neural network;
receiving one or more predicted next user actions from the trained neural network;
identifying that a selected one of the predicted next user actions is of a high importance and is outside of a pre-defined range; and
performing a proactive response that is based on a behavior of the user that is identified as being outside of a pre-defined scope and the selected high importance predicted next user.

8. The information handling system of claim 7 wherein the neural network is a Long Short-Term Memory (LSTM) neural network.

9. The information handling system of claim 7 wherein the actions further comprise:
determining that the predicted next user actions are likely to cause a system performance issue at the cloud-based system;
identifying the proactive response to address the determined system performance issue; and
performing the identified proactive response prior to receiving one or more next user actions from the user.

10. The information handling system of claim 9 wherein the system performance issue is selected from the group consisting of a CPU utilization issue, a memory usage issue, a storage I/O issue, and a network utilization issue.

11. The information handling system of claim 7 wherein the actions further comprise:
determining that the predicted next user actions are likely to cause a security issue at the cloud-based system; and
identifying and performing a proactive security response prior to receiving one or more next user actions from the user, wherein the proactive security response increases the security of the cloud-based system, and wherein the proactive security response is performed prior to receiving one or more next user actions from the user.

12. The information handling system of claim 11 wherein the actions further comprise:
sending the user a verification code to a mobile device assigned to the user to verify that the user is an authorized user of the cloud-based system;
receiving a user-input code from the user;
inhibiting use of the cloud-based system by the user in response to the received user-input code being different from the sent verification code; and
allowing use of the cloud-based system by the user in response to the received user-input code matching the sent verification code.

13. A computer program product stored in a computer readable storage medium, comprising computer program code that, when executed by an information handling system, performs actions comprising:
training neural network, wherein the training comprises:
receiving a plurality of data inputs to a cloud-based system from a plurality of users;
gathering a plurality of sets of responsive system data from the cloud-based system, wherein each of the sets of responsive data corresponds to one or more of the received data inputs; and
training the neural network by passing the received data inputs and corresponding sets of responsive data through the neural network;
receiving one or more user actions from a user of the cloud-based system;
inputting the one or more user actions to the trained neural network;
receiving one or more predicted next user actions from the trained neural network;
identifying that a selected one of the predicted next user actions is of a high importance and is outside of a pre-defined range; and
performing a proactive response that is based on a behavior of the user that is identified as being outside of a pre-defined scope and the selected high importance predicted next user action.

14. The computer program product of claim 13 wherein the neural network is a Long Short-Term Memory (LSTM) neural network.

15. The computer program product of claim 13 wherein the actions further comprise:
determining that the predicted next user actions are likely to cause a system performance issue at the cloud-based system;
identifying the proactive response to address the determined system performance issue; and
performing the identified proactive response prior to receiving one or more next user actions from the user.

16. The computer program product of claim 13 wherein the actions further comprise:
determining that the predicted next user actions are likely to cause a security issue at the cloud-based system; and
identifying and performing a proactive security response prior to receiving one or more next user actions from the user, wherein the proactive security response increases the security of the cloud-based system, and wherein the proactive security response is performed prior to receiving one or more next user actions from the user.

17. The computer program product of claim 16 wherein the actions further comprise:
- sending the user a verification code to a mobile device assigned to the user to verify that the user is an authorized user of the cloud-based system;
- receiving a user-input code from the user;
- inhibiting use of the cloud-based system by the user in response to the received user-input code being different from the sent verification code; and
- allowing use of the cloud-based system by the user in response to the received user-input code matching the sent verification code.

\* \* \* \* \*